No. 864,705. PATENTED AUG. 27, 1907.
C. SKIDMORE.
JOURNAL BEARING.
APPLICATION FILED SEPT. 17, 1906.

Witnesses
Frank B. Hoffman
K. Allen

Inventor
Charles Skidmore
By Victor J. Evans
Attorney

UNITED STATES PATENT OFFICE.

CHARLES SKIDMORE, OF HOMER, NEBRASKA, ASSIGNOR OF ONE-THIRD TO DANIEL B. STIDWORTHY AND ONE-THIRD TO FRANK B. BUCKWALTER, OF HOMER, NEBRASKA.

JOURNAL-BEARING.

No. 864,705.   Specification of Letters Patent.   Patented Aug. 27, 1907.

Application filed September 17, 1906. Serial No. 334,836.

*To all whom it may concern:*

Be it known that I, CHARLES SKIDMORE, a citizen of the United States, residing at Homer, in the county of Dakota and State of Nebraska, have invented new and useful Improvements in Journal-Bearings, of which the following is a specification.

The invention relates to an improvement in journal bearings, comprehending specifically a journal bearing of the self-lubricating and dust proof type readily adapted as a bearing for vehicle wheels and for all forms of shafting.

The main object of the present invention resides in the production of a journal bearing wherein the bearing box is conveniently secured relative to the vehicle hub or shaft support; and in which the lubricant is effectively retained within the boxing, and the latter rendered dust and dirt proof, the construction particularly providing a means whereby the packing rings may be readily and conveniently adjusted to insure a dust tight connection with the shafting under all conditions of use and wear.

The invention will be described in the following specification, reference being had particularly to the accompanying drawings, in which:—

Figure 1:
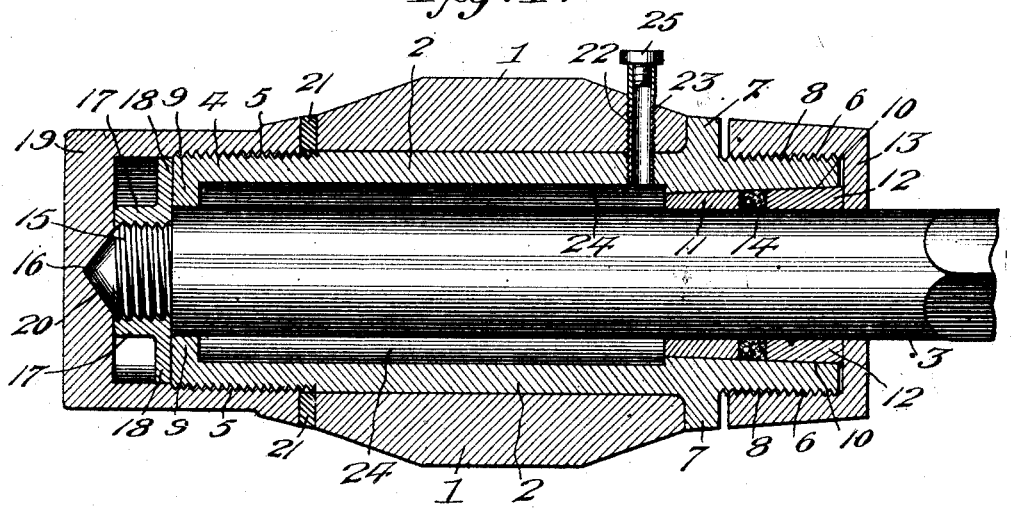
Figure 2:
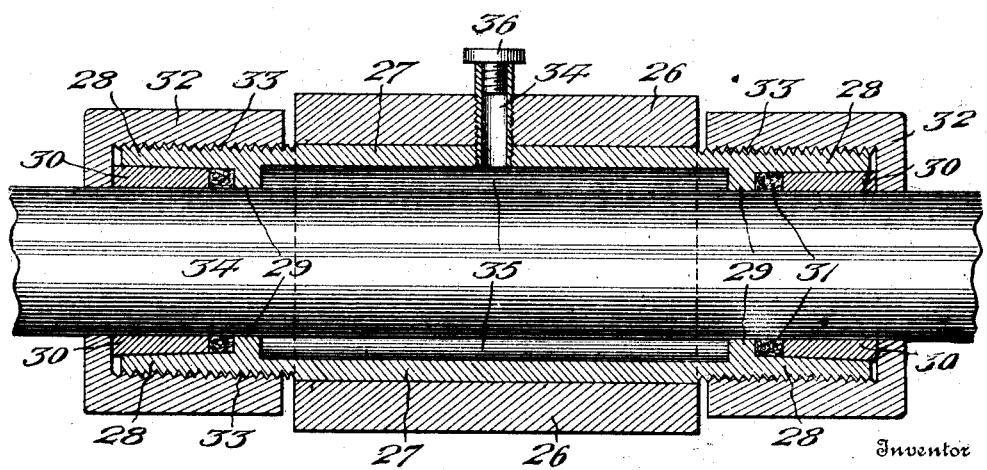

Figure 1 is a longitudinal sectional view, partly in elevation, of a journal bearing constructed in accordance with my invention and designed for use with vehicle wheels or similar rotating elements, Fig. 2 is a similar view showing the bearing slightly modified to provide for its use as a support for a revolving shaft.

Referring particularly to Fig. 1, wherein the journal bearing of my invention is particularly constructed for use with vehicle wheels or similar revolving elements, 1 represents the hub of the wheel or other element, in which is secured the boxing 2.

The boxing is in the form of an elongated cylindrical sleeve, designed as usual to encircle the axle spindle 3. The boxing is of a length to extend in both directions beyond the limits of the hub 1, the forward extension 4 of the boxing being exteriorly threaded at 5 throughout its full length beyond the hub. The rearward extension 6 of the boxing is provided immediately adjacent the relatively rear or inner edge of the hub with a laterally extending annular rib 7, designed to provide an abutment against which the inner edge of the hub bears when the parts are assembled. Beyond the rib 7 the boxing is exteriorly threaded throughout the length of the extension 6, as at 8.

The interior diameter of the boxing is greater than the diameter of the spindle 3, said boxing being provided at its relatively forward end with an inwardly projecting annular bearing rib or ring 9 designed to bear directly upon the spindle. Throughout the length of the rearward extension 6 the boxing is interiorly reduced in diameter to a small extent, the inner surface converging from the relatively rear or free end of the extension, as at 10. A bearing ring 11 is designed to fit within the boxing and bear upon the spindle 3, the exterior surface of said ring being relatively inclined to engage the converging surface 10 of the boxing, whereby said ring is held in place within the boxing by the wedging incident to such construction. A retaining ring 12 is arranged within the boxing and about the spindle, said retaining ring being inserted from the relatively rear end of the spindle and adapted for an independent longitudinal movement as respects the boxing. A closing cap 13 is designed to encircle the boxing extension 6 and bear against the rib 7, said cap being interiorly threaded to engage the threads 8 of the extension 6.

The bearing ring 11 and retaining ring 12 are of such relative sizes as to normally provide a space between their approximate edges, in which space is disposed absorbent packing material or a packing ring 14 which is designed for adjustment through movement of the cap 13, as will later appear.

The forward end of the spindle 3 is formed with a reduced threaded extension 15, terminating in a hardened conical end 16. The boxing 2 is held in place against independent endwise movement through the medium of a lock nut 17 designed to engage the threaded extension of the spindle and formed with an annular laterally disposed flange 18 of slightly less diameter than the diameter of the boxing and adapted when in place to bear against the relatively forward end of the boxing. A cap 19 is designed to encircle and conceal the forward end of the spindle, the lock nut, and the forward end of the boxing, said cap being interiorly threaded to coöperate with the threads 5 on the boxing extension 4. The inner surface of the head or face plate of the cap is formed with a conical depression 20 to receive the spindle extension 16.

If desired, washers 21 of any material and in any desired number may be disposed intermediate the end of the cap 19 and the hub 1 of the rotating member, whereby to provide for the adjustment of the play of said hub.

The hub 1 and boxing 2 are formed with registering openings 22 designed to receive an oil duct 23 opening at its lower end within the oil chamber 24 and closed at the upper end by a removable cap 25. In this connection it is to be noted that the oil chamber 24 is formed between the bearing rings 9 and 11, thereby providing an elongated space for the reception of a considerable quantity of lubricant.

In the form of the invention described it is to be particularly noted that the packing ring 14 may be adjusted or spread by appropriate movement of the cap 13, said movement serving to force inward the retaining ring 12 and thereby compress the packing ring. Endwise movement of the boxing in either direction is prevented by the coöperation of the lock nut 17 and cap 19, the former preventing a relatively forward movement of the boxing and the latter a relatively rearward movement thereof. The boxing is held relative to the hub 1 through coöperation of the rib 7 and cap 19.

In Fig. 2 the main details of the boxing hereinbefore described are shown, the construction being slightly modified to adapt the boxing for supporting a rotating shaft intermediate the ends. In this form the bearing support 26 is of the usual hollow cylindrical form, and adapted to receive the improved boxing 27, said boxing projecting in opposite directions beyond the ends of the support to provide extensions 28. The interior of the boxing adjacent the relatively inner end of each extension is formed with an inwardly projecting annular bearing ring 29, the interior surface of the boxing beyond said ring diverging slightly toward the free end of the extension. A retaining ring 30, similar to the ring 12 in the preferred form, is arranged for coöperation with and independent movement relative to the interior surface of the boxing beyond the bearing ring, and between said retaining ring and bearing ring is arranged absorbent packing material or a packing ring 31. A cap 32 is designed to encircle each spindle extension, said extension and cap being threaded for coöperation, as at 33. The face plates of the cap are of a size to bear upon the shaft 34, thereby engaging the ends of the retaining ring and causing said rings to compress the packing ring upon proper adjustment of the cap.

In both forms of the invention it is to be particularly noted that the adjustment of the cap or caps provides for such disposition of the absorbent packing material or packing ring as will insure the retention of the oil within the oil chamber and at the same time exclude dust and dirt from the bearing. The respective coöperation of the particular parts provides for their ready disconnection when desired for inspection or renewal, as the removal of the caps affords immediate access to the working parts of the bearing.

The bearing rings 9 and 29 in the preferred and modified forms are shown as integral with the boxing, but it is to be understood that I contemplate providing removable bearing rings, as ring 11, for use in place of the integral rings 9 and 29, the coöperating interior surface of the boxing being correspondingly inclined to insure a wedging action between the ring and boxing.

The removable feature of the bearing rings is an important feature of the present invention, as it provides for the convenient replacement of worn rings with convenience and thereby obviating the necessity of disposing of the entire boxing.

The modified form of bearing is provided with an oil supply duct 34 leading to the oil channel 35 formed between the bearing rings 29 in the boxing, said duct being closed by a removable cap 36.

The form of boxing shown in Fig. 1 while primarily adapted for vehicle wheels or other rotating elements, will be found equally applicable as a bearing support for the ends of rotating shafts, while the form illustrated in Fig. 2 though described as a fixed bearing for rotating shafts is equally applicable as a bearing for rotating elements about a fixed shaft.

Having thus described the invention, what is claimed as new, is:—

1. A boxing formed with a threaded extension, a bearing ring arranged within the boxing, a packing ring adapted to contact with the bearing ring, a retaining ring disposed within the boxing and adapted to engage the packing ring, and a cap arranged for coöperation with the threaded extension and adapted to engage and operate the retaining ring.

2. The combination with a support, of a boxing fitting within said support and formed with a threaded extension projecting beyond the support, a bearing ring removably secured within the boxing, a retaining ring movably secured within the boxing, a packing ring arranged between the bearing ring and retaining ring, and a cap to engage the threaded extension and operate the retaining ring.

In testimony whereof, I affix my signature in presence of two witnesses.

CHARLES SKIDMORE.

Witnesses:
JAMES L. BLANCHARD,
AUDREY ALLAWAY.